(12) United States Patent
Christmas et al.

(10) Patent No.: US 11,374,854 B2
(45) Date of Patent: *Jun. 28, 2022

(54) SYSTEMS AND METHODS FOR PEER-TO-PEER COMMUNICATION

(71) Applicant: Fasetto, Inc., Scottsdale, AZ (US)

(72) Inventors: Coy Christmas, Scottsdale, AZ (US); Luke Malpass, Stoke-on-Trent (GB)

(73) Assignee: Fasetto, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,905

(22) Filed: Sep. 22, 2020

(65) Prior Publication Data

US 2021/0014154 A1 Jan. 14, 2021

Related U.S. Application Data

(63) Continuation of application No. 16/117,289, filed on Aug. 30, 2018, now Pat. No. 10,812,375, which is a
(Continued)

(51) Int. Cl.
*H04W 4/00* (2018.01)
*H04L 45/24* (2022.01)
(Continued)

(52) U.S. Cl.
CPC ............ *H04L 45/24* (2013.01); *H04L 45/121* (2013.01); *H04L 63/0428* (2013.01);
(Continued)

(58) Field of Classification Search
CPC ...... H04L 45/24; H04L 45/121; H04W 76/14; H04W 12/0013; H04W 12/003
See application file for complete search history.

(56) References Cited

U.S. PATENT DOCUMENTS 6,952,409 B2 10/2005 Jolitz
8,405,502 B2 3/2013 Teague
(Continued)

FOREIGN PATENT DOCUMENTS

AU 2013352236 11/2018
CN 103945003 7/2001
(Continued)

OTHER PUBLICATIONS

NZ; 2nd Examination Report dated Jan. 26, 2021 in the Application No. 730674.
(Continued)

*Primary Examiner* — Shukri Taha
(74) *Attorney, Agent, or Firm* — Snell & Wilmer L.L.P.

(57) ABSTRACT

Systems, methods, and computer program products for transmitting data between devices are disclosed. A device may utilize a standardized communication system ("SCS") to transmit data directly between devices including an SCS. The SCS may discover available devices. The SCS may determine available transmission paths between a first device and a second device. The SCS may select a transmission path between the first device and the second device, and the SCS may transmit data from the first device to the second device using a standardized communication protocol ("SCP").

37 Claims, 7 Drawing Sheets

Related U.S. Application Data continuation of application No. 15/435,884, filed on Feb. 17, 2017, now Pat. No. 10,084,688, which is a continuation of application No. 14/164,919, filed on Jan. 27, 2014, now Pat. No. 9,584,402.

(51) Int. Cl.

| | | |
|---|---|---|
| *H04L 45/121* | (2022.01) | |
| *H04W 76/14* | (2018.01) | |
| *H04L 9/40* | (2022.01) | |
| *H04W 12/033* | (2021.01) | |
| *H04W 12/50* | (2021.01) | |
| *H04L 69/325* | (2022.01) | |
| *H04W 8/00* | (2009.01) | |
| *H04W 12/02* | (2009.01) | |
| *H04L 67/104* | (2022.01) | |
| *H04W 84/12* | (2009.01) | |
| *H04W 12/77* | (2021.01) | |
| *H04L 9/06* | (2006.01) | |

(52) U.S. Cl.
CPC ............ *H04L 63/061* (2013.01); *H04L 63/18* (2013.01); *H04L 69/325* (2013.01); *H04W 8/005* (2013.01); *H04W 12/02* (2013.01); *H04W 12/033* (2021.01); *H04W 12/50* (2021.01); *H04W 76/14* (2018.02); *H04L 9/0631* (2013.01); *H04L 63/067* (2013.01); *H04L 67/104* (2013.01); *H04W 12/77* (2021.01); *H04W 84/12* (2013.01)

(56) References Cited

U.S. PATENT DOCUMENTS

| | | | |
|---|---|---|---|
| 9,684,887 B2 | 6/2017 | Majeti et al. | |
| 10,084,688 B2 | 9/2018 | Christmas et al. | |
| 10,123,153 B2 | 11/2018 | Christmas et al. | |
| 2002/0146119 A1 | 10/2002 | Liss | |
| 2003/0126272 A1 | 7/2003 | Cori et al. | |
| 2004/0088280 A1 | 5/2004 | Koh et al. | |
| 2006/0057960 A1 | 3/2006 | Tran | |
| 2006/0239275 A1 | 10/2006 | Zlateff et al. | |
| 2006/0294386 A1 | 12/2006 | Yuval et al. | |
| 2007/0160198 A1 | 7/2007 | Orsini | |
| 2007/0282601 A1 | 12/2007 | Li | |
| 2008/0052461 A1 | 2/2008 | Kavian | |
| 2008/0223890 A1 | 9/2008 | Techiolli | |
| 2008/0313450 A1 | 12/2008 | Rosenberg | |
| 2009/0097459 A1 | 4/2009 | Magnus | |
| 2009/0116445 A1 | 5/2009 | Samar et al. | |
| 2009/0191925 A1 | 7/2009 | Moseler | |
| 2009/0239468 A1 | 9/2009 | He et al. | |
| 2009/0274173 A1 | 11/2009 | Wentink | |
| 2011/0051642 A1 | 3/2011 | Krishnaswamy | |
| 2011/0113251 A1 | 5/2011 | Lu et al. | |
| 2011/0294474 A1 | 12/2011 | Barany et al. | |
| 2012/0011200 A1 | 1/2012 | Zhang et al. | |
| 2012/0128172 A1 | 5/2012 | Alden | |
| 2012/0282858 A1 | 11/2012 | Gill et al. | |
| 2013/0225139 A1 | 8/2013 | Moran | |
| 2013/0238711 A1 | 9/2013 | Lashkari et al. | |
| 2013/0272196 A1 | 10/2013 | Li et al. | |
| 2013/0303160 A1 | 11/2013 | Fong et al. | |
| 2014/0136429 A1 | 5/2014 | Psihos | |
| 2014/0141713 A1 | 5/2014 | Shirinfar et al. | |
| 2014/0337640 A1 | 11/2014 | Sharma et al. | |
| 2014/0351181 A1 | 11/2014 | Canoy et al. | |
| 2014/0376405 A1* | 12/2014 | Erickson ............... H04W 60/00 370/254 | |
| 2015/0071272 A1 | 3/2015 | Vermani et al. | |
| 2015/0101018 A1* | 4/2015 | Forte ............... H04L 63/18 726/4 | |
| 2015/0263945 A1 | 9/2015 | Blessing | |
| 2015/0319029 A1 | 11/2015 | Abraham et al. | |
| 2015/0339867 A1 | 11/2015 | Amon | |
| 2015/0382169 A1 | 12/2015 | Burba | |
| 2016/0037055 A1 | 2/2016 | Waddington | |
| 2018/0176293 A1* | 6/2018 | Ding ............... H04W 4/08 |
| 2018/0191632 A1 | 7/2018 | Biederman | |
| 2019/0020576 A1 | 1/2019 | Christmas | |
| 2019/0037381 A1 | 1/2019 | Christmas | |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 101534505 | 9/2009 |
| CN | 102224751 | 10/2011 |
| CN | 102376133 | 3/2012 |
| CN | 102591571 A | 7/2012 |
| CN | 102984784 | 3/2013 |
| CN | 103095852 | 5/2013 |
| CN | 103139767 | 6/2013 |
| CN | 103546181 A | 1/2014 |
| CN | 103840942 | 6/2014 |
| CN | 106797337 | 5/2018 |
| CN | 105706033 | 5/2019 |
| EP | 0800144 A2 | 10/1997 |
| EP | 1168769 A2 | 2/2002 |
| EP | 1761048 A2 | 3/2007 |
| EP | 1806649 A1 | 7/2007 |
| EP | 3022638 | 4/2018 |
| HK | 1242492 | 6/2018 |
| JP | 09-091155 | 4/1997 |
| JP | 2007-049606 | 2/2007 |
| JP | 20100141567 | 6/2010 |
| JP | 2010-535351 | 11/2010 |
| JP | 2011-134159 | 7/2011 |
| JP | 2011-147136 | 7/2011 |
| JP | 2011-248489 | 12/2011 |
| JP | 2009-087035 | 8/2012 |
| JP | 2013-214801 | 10/2013 |
| JP | 6310477 | 4/2018 |
| JP | 2018-514845 | 6/2018 |
| JP | 6479026 | 2/2019 |
| KR | 10-20040108122 | 12/2004 |
| KR | 10-20050098078 | 10/2005 |
| KR | 10-20090059672 | 6/2009 |
| KR | 10-20100056594 | 5/2010 |
| KR | 10-20120092487 A | 8/2012 |
| KR | 10-20120059488 | 5/2013 |
| KR | 10-20170047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | 2005050393 | 6/2005 |
| WO | 2006107324 | 10/2006 |
| WO | 2006125027 | 11/2006 |
| WO | 2007076494 A2 | 7/2007 |
| WO | 2007103908 A2 | 9/2007 |
| WO | 2008090902 | 7/2008 |
| WO | 2009016612 | 2/2009 |
| WO | 2010018551 | 8/2010 |
| WO | 2012087847 A2 | 6/2012 |
| WO | 2014012486 | 1/2014 |
| WO | 2014016622 | 1/2014 |
| WO | 2014085502 | 6/2014 |
| WO | 2014138187 | 9/2014 |
| WO | 2014141235 | 9/2014 |
| WO | 2014151925 A1 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |

(56) References Cited

FOREIGN PATENT DOCUMENTS

| WO | 2018144833 | 8/2018 |
|---|---|---|
| WO | 2018232186 | 12/2018 |
| WO | 2019079628 | 4/2019 |

OTHER PUBLICATIONS

CA; Notice of Allowance dated Jan. 11, 2021 in the Application No. 2937810.
USPTO; Final Office Action dated Dec. 2, 2020 in the U.S. Appl. No. 16/152,342.
TW; Notice of Allowance dated Nov. 20, 2020 Application No. 108126572.
CN; Second Office Action dated Aug. 24, 2020 in Application No. CN201580065117.0.
EP; Extended Search Report dated Oct. 1, 2020 in EP174067.7.
EP; Examination Report dated Oct. 6, 2020 in EP15848371.9.
KR; Notice of Allowance dated Nov. 1, 2020 in Application No. 10-2017-7011784.
AU; First Office Action dated Dec. 15, 2020 in Application No. 202000894.
01934 CN; Third Office Action dated Dec. 10, 2020 Application No. 201580065117.0.
USPTO; Notice of Allowance dated Apr. 14, 2021 in the U.S. Appl. No. 16/152,342.
USPTO; Supplemental Notice of Allowance dated Apr. 21, 2021 in the U.S. Appl. No. 16/152,342.
CN; China Notice of Grant dated May 21, 2021 in the Application No. 201580065117.0.
JP; Japanese Notice of Reason for Rejection dated Apr. 28, 2021 in the Application No. 2020-075182.
KR; Preliminary Rejection dated Jan. 22, 2021 in Application No. 10-2016-7023619.
KR; Preliminary Rejection dated Mar. 2, 2021 in Application No. 10-2021-7003267.
USPTO; Office Action dated Sep. 18, 2015 in U.S. Appl. No. 14/164,919.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated May 4, 2017 in U.S. Appl. No. 14/745,100.
USPTO; Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Feb. 26, 2018 in U.S. Appl. No. 14/745,100.
USPTO; Notice of Allowance dated May 22, 2018 in U.S. Appl. No. 15/435,884.
USPTO; Notice of Allowance dated Jun. 20, 2018 in U.S. Appl. No. 15/435,884.
USPTO; Notice of Allowance dated Jul. 5, 2018 in U.S. Appl. No. 14/745,100.
USPTO; Restriction Requirement dated Jun. 20, 2019 in U.S. Appl. No. 16/152,342.
USPTO; Non-Final Office Action dated Sep. 30, 2019 in U.S. Appl. No. 16/152,342.
USPTO; Non-Final Office Action dated Dec. 31, 2019 in the U.S. Appl. No. 16/117,289.
USPTO; Notice of Allowance dated Jun. 18, 2020 in the U.S. Appl. No. 16/117,289.
USPTO; Final Office Action dated Mar. 26, 2020 in the U.S. Appl. No. 16/152,342.
USPTO; Advisory Action dated Jun. 5, 2020 in the U.S. Appl. No. 16/152,342.
USPTO; Non-Final Office Action dated Jul. 9, 2020 in the U.S. Appl. No. 16/152,342.
EP; Extended Search Report dated Sep. 17, 2015 in Application Serial No. 15740208.2.
Sweden; Office Action dated Nov. 18, 2015 in Application Serial No. 1551071-2.
EP; Supplemental Search Report dated Jun. 14, 2016 in Application Serial No. 13859205.0.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X [Assoc did not report OA dated Sep. 27, 2017].
CN; 2nd Examination Report dated Apr. 18, 2018 in Application Serial No. 201380070415.X.
CN; Examination Report dated May 9, 2018 in Application Serial No. 201480023946.8.
CN; 1st Office Action dated Nov. 20, 2018 in Application Serial No. 201580016416.5.
MX; 2nd Examination Report dated Oct. 24, 2017 in Application Serial No. 2015/011314.
MX; 3rd Examination Report dated Jul. 2, 2018 in Application No. 2015/011314.
EP; Supplemental Search Report dated Sep. 15, 2017 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
TW; Notice of Allowance dated May 15, 2018 in Application Serial No. 104102514.
EP; Extended Search Report dated Apr. 9, 2018 in Application Serial No. 15848371.9.
EP; Supplementary Search Report dated Apr. 30, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Notice of Allowance dated Mar. 17, 2018 in Application Serial No. 2015-545200.
JP; Office Action dated Feb. 2, 2018 in Application Serial No. 2016-549317.
AU; 1st Office Action dated Apr. 13, 2018 in Application Serial No. 2013352236.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 in Application Serial No. MX/a/2016/003798.
CN; 3rd Examination Report dated Oct. 31, 2018 in Application Serial No. CN 201380070415.
EPO; Examination Report dated Nov. 8, 2018 in Application No. EP 15740208.2.
AU; Examination Report dated Dec. 19, 2018 in Application Serial No. AU 2014225864.
AU; 2nd Examination Report Mar. 20, 2019 in Application No. AU 2014225864.

(56) References Cited

OTHER PUBLICATIONS

EP; Notice of Intent to Grant dated Jan. 4, 2019 in Application No. EP14760041.5.
CN; Notice of Intent to Grant dated Jan. 30, 2019 in Application No. CN 201480023946.8.
EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 in Application No. 201480065117.6.
CN; Third Office Action dated Aug. 8, 2019 in Application No. 201480065117.6.
EP; European Notice of Intent to Grant in the Application No. 15740208.2-1215 dated Nov. 27, 2019.
CN; Chineese Decision to Grant Patent in the Application No. 201580016416.5 dated Dec. 31, 2019.
CA; Canadian Office Action in the Canadian Application No. 2937810 dated Jan. 30, 2020.
CA; Second Canadian Office Action in the Canadian Application No. 2937810 dated Aug. 19, 2020.
CA; Notice of Allowance in the Canadian Application No. 15740208.2 dated Apr. 17, 2020.
KR; Notice on Preliminary Rejection first Office Action Application No. 1020177011784.
NZ; New Zealand Office Action dated Jul. 14, 2020 in the Application No. 730674.
CN; Chinese Second Office Action dated Aug. 24, 2020 in the Application No. 201580065117.0.
IN; Indian Office Action dated Sep. 17, 2020 in the Application No. 201717014878.
CN; Chinese Second Office Action dated Jun. 4, 2019 in the CN Application No. 201580016416.6.
EP; European Examination Search Report dated Oct. 6, 2020 in the EP Application No. 15848371.9.
KR; Korean Notice of Allowance in the KR Application No. 9-5-2020-075537678 dated Nov. 1, 2020.
EP; European Search Report dated Oct. 1, 2020 in the EP Application No. 20174067.7.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
Kim, Young-Gon, and Moon-Seog Jun. A design of user authentication system using QR code identifying method. Computer Sciences and Convergence Information Technology (ICCIT), 6th International Conference on IEEE. Nov. 29-Dec. 1, 2011.
Application Programming Interface by David Orenstein published Jan. 10, 2000 on Computerworld.com.
Gerd Kortuem et al., "Architectural Issues in Supporting Ad-hoc Collaboration with Wearable Computers," In: Proceedings of the Workshop on Software Engineering for Wearable and Pervasive Computing at the 22nd International Conference on Software Engineering, 2000.
3rd party observation dated Dec. 22, 2015 against Patent Application No. 1551071-2 in Sweden.
Revault Product Data Sheet dated Mar. 19, 2015.
Dusk Jockeys; Dust Jockeys Android Apps dated Mar. 7, 2012, pp. 1-5.
Sue White: Wi-Fi and Bluetooth Coexistence, Electronic Component News, Mar. 2, 2012, pp. 1-7, XP05504386, Retrieved from Internet: URL: https://www.ecnmag.com/article/2012/03/wi-fi-andbluetooth-coexistence [retrieved on Sep. 6, 2017].
"Class Persistent Manager," https://web.archive.org/web/20131110042918/https://tomcat.apache.org/tomcat-4.1-doc/catalina/docs/api/org/apache/catalina/session, 3 Pages, (Oct. 2018).
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
UAE; 1st Office Action dated Sep. 29, 2021 in UAE Application No. P6000385/2017.
CA; Canadian Office Action dated Aug. 10, 2021 in CA Application No. 2,963,079.
KR; Notice of Last Office Action dated Sep. 1, 2021 in KR Application No. 10-2021-7003267.
Gerd et al., "Architectural Issues in Supporting Ad-hoc Collaboration with Wearable Computers", *Proceedings of the Workshop on Software Engineering for Wearable and Pervasive Computing at the 22nd International Conference on Software Engineering*, pp. 2-3, http://citeseerx.ist.psu.edu/viewdoc/download?doi=10.1.1.35.7636&rep=rep1&type=pdf), 2000.
CA; Office Action dated Aug. 10, 2021 in Application Serial No. 2,963,079.
JP; Examination Report dated May 6, 2021 in JP Application No. 2020 075182.
EP; Examination Report dated Nov. 29, 2021 in EP Application No. 20174067.7.
CN; Office Action dated Aug. 24, 2021 in Appl No. 202010161265.5.

\* cited by examiner

```
                                    400 mBroadcastingSocket = new Socket(AddressFamily.InterNetwork,
SocketType.Dgram, ProtocolType.Udp);
      mBroadcastingSocketEventArgs = new SocketAsyncEventArgs();
      mBroadcastingSocket.Ttl = 255;                                    ⎫
                                                                       ⎬ 410
      var broadcastaddress = GetBroadcastAddress();                     ⎭
      mBroadcastingSocketEventArgs.RemoteEndPoint = new
IPEndPoint(broadcastaddress, UDPPort);

// Send the IP address we are listening on
      string packetData = JsonConvert.SerializeObject(LocalClient);     ⎫
      byte[] payload = Encoding.UTF8.GetBytes(packetData);              ⎬ 420
      mBroadcastingSocketEventArgs.SetBuffer(payload, 0, payload.Length);⎭

// Make an asynchronous Send request over the socket
      mBroadcastingSocket.SendToAsync(mBroadcastingSocketEventArgs);

mDiscoverySocket = new DatagramSocket();
      // This is the TTL but on datagram socket the default of 128 is more than
enough
      mDiscoverySocket.Control.OutboundUnicastHopLimit = 255;           ⎫
      mDiscoverySocket.MessageReceived += DiscoverySocketNewMessage;    ⎬ 430

Await mDiscoverySocket.BindServiceNameAsync(UDPPort.ToString()); // Port
      mDiscoverySocket.JoinMulticastGroup(new HostName(MULTICAST_ADDRESS));⎭ var writer = new DataWriter(await
socket.GetOutputStreamAsync(eventArguments.RemoteAddress,
eventArguments.RemotePort));
      await writer.StoreAsync();

var reader = eventArguments.GetDataReader();                      ⎫
      var data = new byte[reader.UnconsumedBufferLength];               ⎬ 440
      reader.ReadBytes(data);

// Get info from it
      var userDetails =
JsonConvert.DeserializeObject<IDiscoveredClient>(Encoding.UTF8.GetString(data, 0,
data.Length));                                                          ⎭
```

/// <summary>
    /// The broadcast message coming from a device that can be discovered
    /// </summary>
    public interface IDiscoveredClient
    {
        /// <summary>
        /// The name of the device (such as Windows Phone 8, iPhone 5 etc...)
        /// </summary>
        string DeviceName { get; set; }

/// <summary>
        /// The IP address where this device can be reached
        /// </summary>
        string ImagePath { get; set; }

/// <summary>
        /// The name of the owner of the device (such as the email account or
computer username)
        /// </summary>
        string Username { get; set; }

/// <summary>
        /// The devices endpoint (IP or name)
        /// </summary>
        string Endpoint { get; set; }

/// <summary>
        /// The transport layer (such as Bluetooth, NFC, WFD, PDQ) that this
client was discovered on
        /// </summary>
        string TransportLayer { get; set; }
    }
```

/// <summary>
/// The broadcast message coming from a device that can be discovered
/// </summary>
public interface IFileTransferRequest
{
    /// <summary>
    /// The client wishing to share the file with you
    /// </summary>                                                          }  610
    IDiscoveredClient Client { get; set; }

/// <summary>
    /// The filename of the file wanting to be sent
    /// </summary>                                                          }  620
    string Filename { get; set; }

/// <summary>
    /// The size of the file wanting to be sent
    /// </summary>                                                          }  630
    long Filesize { get; set; }

/// <summary>
    /// The client that will be receiving the file from you
    /// </summary>                                                          }  640
    IDiscoveredClient ReceivingClient { get; set; }

/// <summary>
    /// The unique ID for this file transfer
    /// </summary>                                                          }  650
    Guid UniqueID { get; set; }

/// <summary>
    /// The transport layer associated with this request
    /// </summary>                                                          }  660
    string TransportName { get; set; }
}
```

```
/// <summary>
/// The response from a file transfer request
/// </summary>
public interface IFileTransferResponse
{
    /// <summary>
    /// The response from the user
    /// </summary>
    bool Response { get; set; }              }710

/// <summary>
    /// The unique ID for this file transfer
    /// </summary>
    Guid UniqueID { get; set; }              }720
} public interface IFileReceivedConfirmation
{
    bool Response { get; set; }              }730
    Guid UniqueID { get; set; }
}
```

FIG. 7 ns and claims when considered
SYSTEMS AND METHODS FOR PEER-TO-PEER COMMUNICATION

CROSS-REFERENCE TO RELATED APPLICATIONS

This application is a continuation of and claims priority to U.S. Ser. No. 16/117,289 titled "SYSTEMS AND METHODS FOR PEER-TO-PEER COMMUNICATION," and filed on Aug. 30, 2018, the contents of which are incorporated by reference herein in their entirety. The '289 application is a continuation of, and claims priority to U.S. Pat. No. 10,084,688 issued on Sep. 25, 2018 (aka U.S. Ser. No. 15/435,884 filed Feb. 28, 2017) and titled "SYSTEMS AND METHODS FOR PEER-TO-PEER COMMUNICATION," the contents of which are incorporated by reference herein in their entirety. The '884 application is a continuation of, and claims priority to U.S. Pat. No. 9,584,402 issued on Feb. 28, 2017 (aka U.S. Ser. No. 14/164,919 filed Jan. 27, 2014) and entitled "SYSTEMS AND METHODS FOR PEER TO PEER COMMUNICATION," the contents of which are incorporated by reference herein in their entirety.

FIELD

The present disclosure generally relates to transmitting data, and more particularly to systems and methods for peer-to-peer communication.

BACKGROUND

Communication between devices is typically performed over a network, such as the internet or a local area network. However, networks may not always be available for communication between devices and additionally may expose communications to security breaches on the network. Devices enabled with Bluetooth® may communicate directly. However, Bluetooth® enabled devices must be within a limited range, and communication speeds may be relatively slow.

Many devices may include a wireless chip. Manufacturers may create specialized wireless chips which enable communication between devices containing compatible wireless chips. However, such devices may be unable to communicate with other devices containing chips manufactured by other manufacturers.

SUMMARY

Systems, methods, and computer-readable media for transmitting data are disclosed. In various embodiments, a method may include implementing a standardized communications protocol ("SCP") on a first device. The method may further include discovering a second device. The method may further include selecting a transmission path. The method may further include transmitting a message to the second device.

In various embodiments, a method may comprise receiving, by a first device comprising a processor for communicating with a second device, a datagram from a second device. The method may further comprise identifying a standardized communication protocol ("SCP") header in the datagram. The method may further comprise transmitting, by the processor, a list of available transmission paths to the second device. The method may further comprise receiving, by the processor, a message from the second device over at least one transmission path in the list of available transmission paths.

BRIEF DESCRIPTION OF THE DRAWINGS

A more complete understanding may be derived by referring to the detailed description and claims when considered in connection with the Figures, wherein like reference numbers refer to similar elements throughout the Figures, and:

FIG. 4 illustrates a discovery protocol according to various embodiments;

FIG. 5 illustrates a definition for a discovery protocol according to various embodiments;

FIG. 6 illustrates a definition for a file transfer request according to various embodiments; and FIG. 7 illustrates a definition for a response to a file transfer request according to various embodiments.

DETAILED DESCRIPTION

Figure 1:
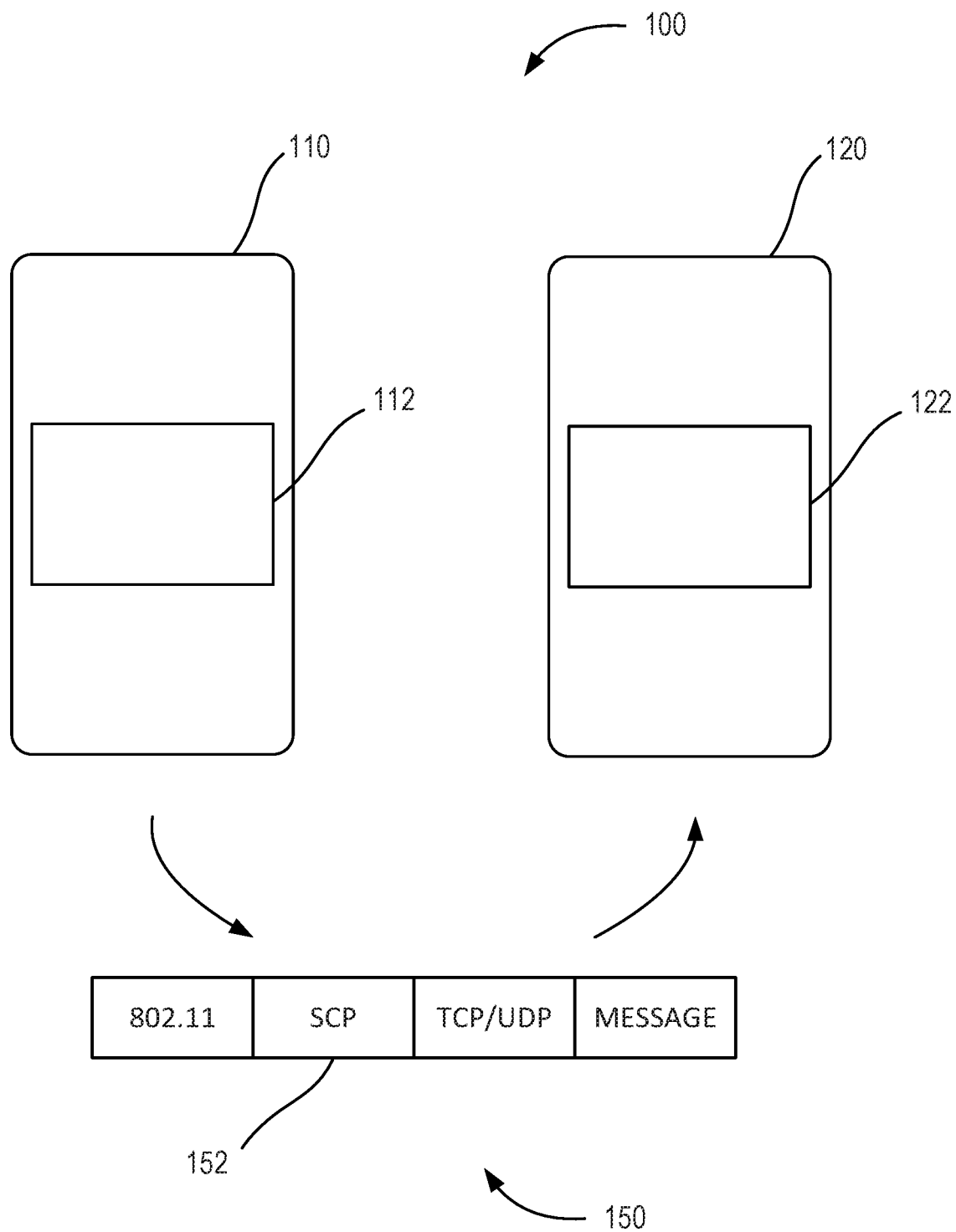
FIG. 1 illustrates a schematic diagram of a system for transmitting messages according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Systems and methods are disclosed herein for peer-to-peer communication between communication devices. As used herein, a "communication device" may refer to any device capable of communication with another device. For, example and without limitation, a communication device may refer to a smartphone, PDA, laptop, desktop computer, portable phone, GPS device, car navigation system, wireless printers, or any other device.

The systems and methods disclosed herein may enable communication between devices without connection to the Internet or other networks. A standardized communication system ("SCS") may be installed on a device. The SCS may comprise any combination of hardware and/or software. The SCS may utilize existing physical components of the device, such as 802.11 wireless chips and Bluetooth® systems in order to communicate with other devices. The SCS may be suitable for any communication protocol, such as IP, TCP/UDP, Bluetooth®, raw Manchester encoding, and any other form of wireless communication.

The SCS may allow communication between devices of varying types and platforms. Additionally, as communication may be directly between devices without transmitting data across a network, communication may be available when networks are unavailable, and communications may be protected from eavesdroppers on a network. Furthermore, direct communication between devices may avoid data charges on cellular data plans.

Referring to FIG. 1, a system 100 for transmitting messages is illustrated according to various embodiments. A first device 110 comprising an SCS 112 and a second device 120 comprising an SCS 122 are illustrated according to various embodiments. In various embodiments, SCS 112 and SCS 122 may be aftermarket software programs installed on first device 110 and second device 120. However, in various embodiments, SCS 112 and SCS 122 may be embedded into a chip, such as an 802.11 wireless chip, in first device 110 and/or second device 120.

In various embodiments, the SCS may implement a standardized communication protocol ("SCP") on a device. SCP may attach an SCP header 152 to a packet in order to identify a datagram 150 as an SCP datagram. First device 110 may communicate with second device 120 via SCP. The SCS may recognize the SCP header and may follow the SCP. The SCP may define the ability for devices to discover one another, to request the transfer of raw data, to transmit confirmations on receipt of data, and to perform any other steps involved with transmitting data.

In various embodiments, the SCS may be implemented at the network layer in the Open Systems Interconnection ("OSI") model (or the Internet layer in the TCP/IP model). Regardless of the protocol being used at the transport layer (e.g. TCP, UDP, SCTP, DCCP), the SCP header may allow devices comprising an SCS to communicate via SCP.

In various embodiments, at least one of first device 110 and second device 120 may comprise a smartphone. However, in various embodiments, first device 110 and second device 120 may comprise any type of device capable of transmitting and/or receiving data.

Figure 2:
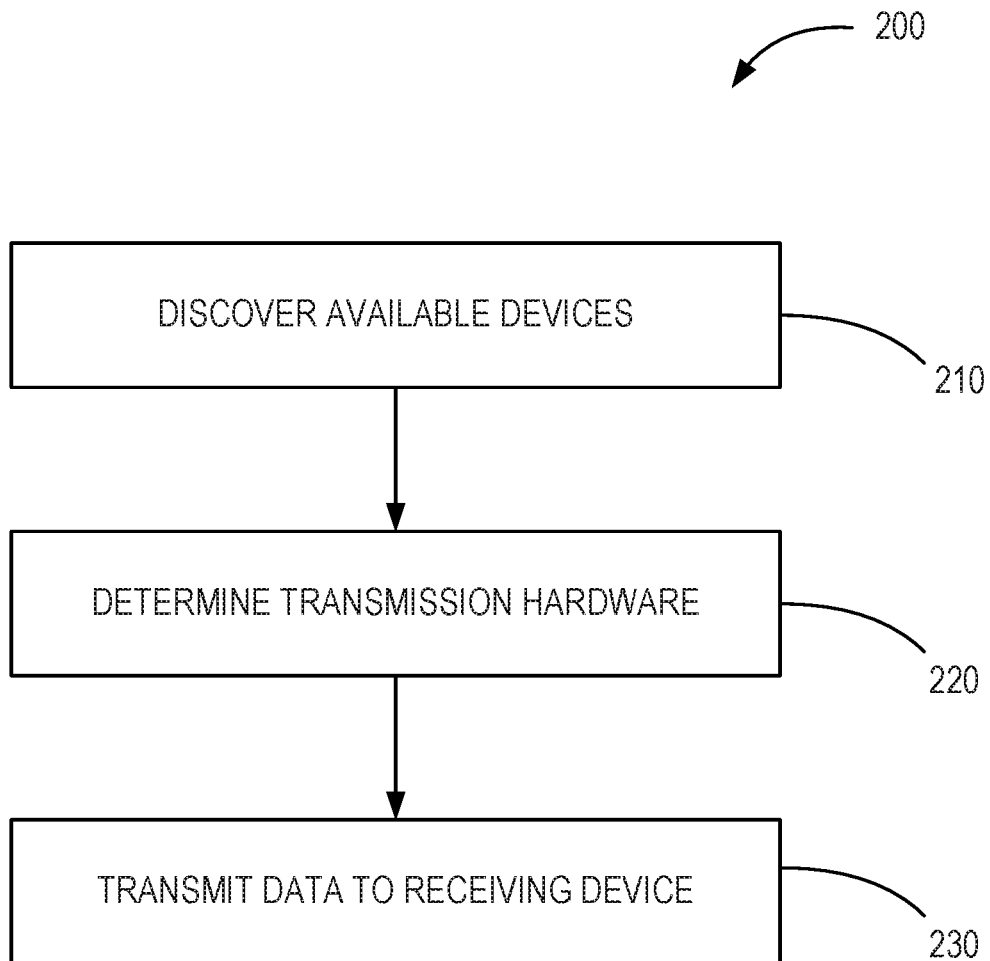
FIG. 2 illustrates a process for transmitting data between devices according to various embodiments.

Referring to FIG. 2, a process 200 for transmitting data between devices is illustrated according to various embodiments. In various embodiments, a first user may wish to transmit data from first device 110 to second device 120. The data may comprise any type of data, such as a text message, image, video, text document, or any other type of file.

First device 110 may discover available devices (step 210). First device 110 may attempt to discover other devices by a variety of methods. In various embodiments, first device 110 may discover other devices via a camera or other optical device. In various embodiments, second device 120 may display a symbol, such as a QR-code, a barcode, or text. The symbol may comprise identifying characteristics about second device 120. For example, in various embodiments the identifying characteristics may comprise at least one of a device name, an IP address of the device, an owner name, an endpoint of the device, and the available transport layers on the device. First device 110 may scan the symbol using a camera. First device 110 may obtain the identifying characteristics from the symbol and use the identifying characteristics in order to transmit data to second device 120.

In various embodiments, the SCS on first device 110 may search for other devices using a wireless chip in first device 110. Devices comprising an SCS may transmit a broadcast message. The broadcast message may comprise the identifying characteristics of the device. In various embodiments, first device 110 may be within transmission range of second device 120. The transmission range may depend on the specific type of wireless chips in first device 110 and second device 120. However, in various embodiments, the transmission range may be up to about 200 feet-300 feet. The SCS may open a socket on first device 110 to listen for broadcast messages. The broadcast message may be sent by a variety of hardware. For example, the broadcast message may be transmitted via an 802.11 wireless chip, Bluetooth® chip, or NFC.

In various embodiments, first device 110 and second device 120 may not be within transmission range of each other. However, an intermediary device, such as a smartphone equipped with hotspot technology, may be within transmission range of first device 110. First device 110 may search for available devices by transmitting a message to intermediary device, instructing intermediary device to look for available devices. Intermediary device may receive a broadcast message from second device 120, and intermediary device may transmit the broadcast message to first device 110. Thus, first device 110 may discover second device 120 without connecting to the internet or a cellular network even though first device 110 may not be within transmission range of second device 120. In various embodiments, any number of intermediary devices may be daisy-chained, such that first device 110 may discover second device 120 from miles apart by transmitting data via a series of intermediary devices.

First device 110 may display a list of all discovered devices to the user. The user may select second device 120 in order to transmit data to second device 120. The user may select a file or message to be transmitted to second device 120.

The SCS 112 on first device 110 may determine the transmission hardware to utilize for the transmission (step 220). In various embodiments, first device 110 and second device 120 may each have only one type of transmission hardware, such as an 802.11 wireless chip, and the SCS 112 may thus select the 802.11 wireless chip to transmit the data. However, in various embodiments, multiple transmission paths may be available between first device 110 and second device 120. For example, first device 110 and second device 120 may each comprise an 802.11 wireless chip and a Bluetooth® chip. In various embodiments, the SCS 112 may determine the fastest transmission path, and may select the fastest transmission path to transmit the data. In various embodiments, the transmission path may be selected by default settings. For example, SCS 112 may always select an 802.11 wireless path for transmission when available, and if the 802.11 wireless path is not available, SCS 112 may select a Bluetooth® path. However, in various embodiments, the SCS 112 on first device 110 may transmit a speed test message to second device 120 via each available transmission path, and the SCS 112 may select the fastest transmission path based on the speed test results.

In various embodiments, the SCS 112 may instruct first device 110 to send the data to second device 120 via multiple transmission paths. A message may be divided into multiple packets. SCS 112 may analyze the available transmissions paths, and send the message over multiple transmission paths in order to expedite transmission of the entire message. For example, SCS 112 may determine that the fastest method of transmitting the message may be to transmit 90% of the packets via an 802.11 wireless path, and 10% of the packets over a Bluetooth® path. SCS 112 may attach an SCP header to each packet being transmitted to second device 120, whether via 802.11 wireless or Bluetooth®. Thus, SCS 122 on second device 120 may recognize the packets as being received by SCP, and SCS 122 may reassemble the packets in order to recreate the entire message. In various embodiments, SCS 112 may analyze all transmission paths available, including but not limited to multiple 802.11 wireless chips, Bluetooth® chips, NFC, PDQ, or any other transmission paths in order to select the fastest transmission method. The SCS on first device 110 may initiate a file send protocol and transmit the data to second device 120 (step 230).

In various embodiments, first device 110 and second device 120 may be connected to the same local network. First device 110 may transmit a link, such as a QR-code, over a cellular network or the local network to second device 120. In various embodiments, the link may comprise 10 kb or less of data. Second device 120 may use the link to request or accept a file transfer. First device 110 may transmit a file over the local network. In various embodiments, the file may be transferred using TCP/IP directly over the local network.

In various embodiments, second device 120 may have access to an internet connection. First device 110 may transmit a link over a cellular transmission path to second device 120, and second device 120 may use the link to download a file stored on the cloud and/or on a server over the internet. In various embodiments, second device 120 may download the file using TCP/IP.

In various embodiments, first device 110 may sync its contents with a cloud database. In various embodiments, first device 110 may comprise an SCS folder, and only files stored in the SCS folder may be synced with the database. First device 110 may transmit a link over a cellular transmission path to second device 120 identifying a file stored on the database. In various embodiments, second device 120 may not have access to an 802.11 wireless network at the time second device 120 receives the link. Second device 120 may use the link to access the file whenever second device 120 gains access to an 802.11 wireless network in order to prevent cellular data charges. In various embodiments, second device 120 may use the link to access the file over the cellular network. In various embodiments, second device 120 may stream all or part of the file over either the cellular network or an 802.11 wireless network.

In various embodiments, first device 110 may share an online folder with second device 120. First device 110 may indicate that second device 120 may have access to an online folder. First device 110 may sync with the online folder to upload files stored on first device 110 to the online folder. Second device 120 may sync with the online folder to download files stored in the online folder to second device 120.

Figure 3:
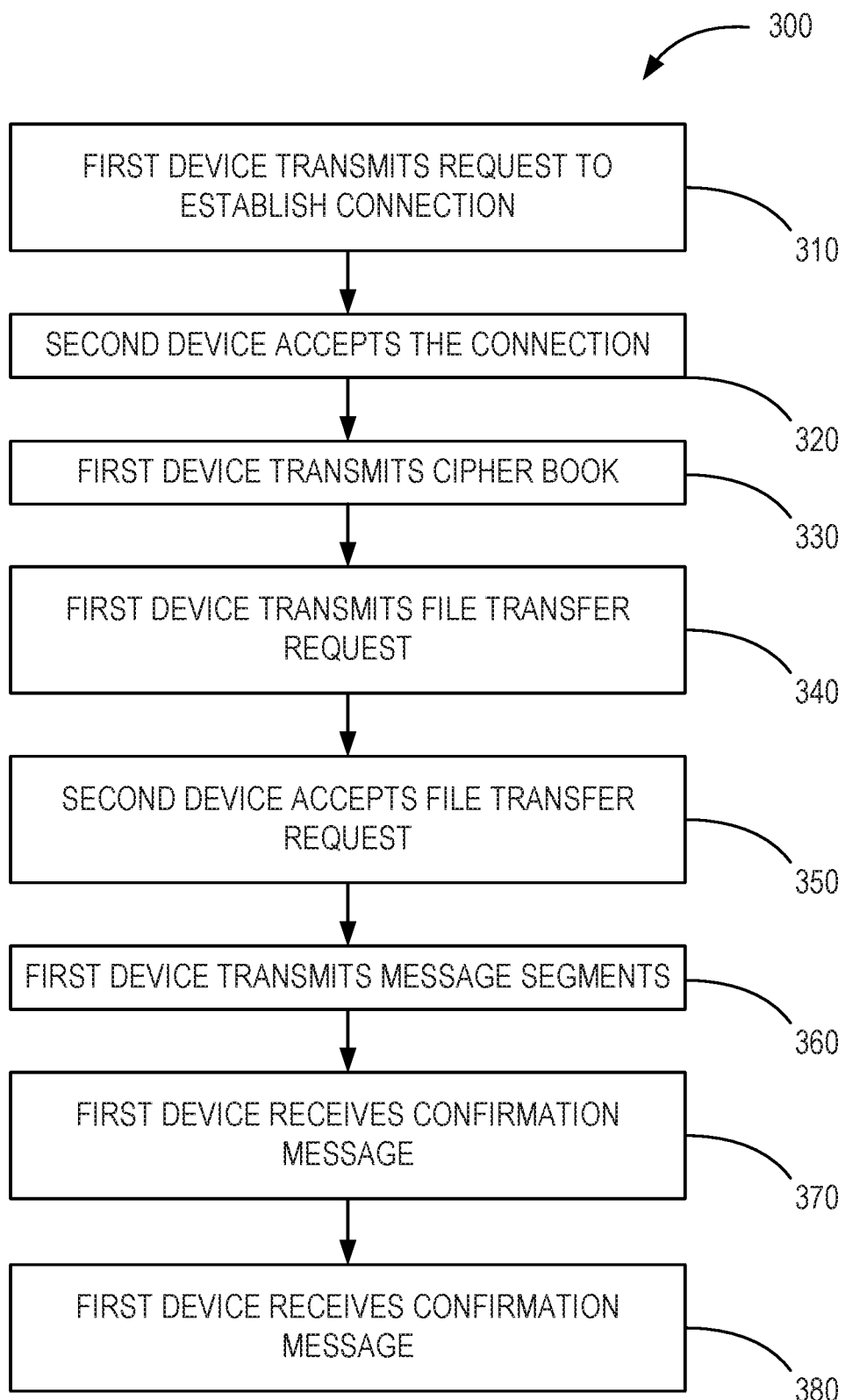
FIG. 3 illustrates a process for a file send protocol according to various embodiments.

Referring to FIG. 3, a process 300 for a file send protocol is illustrated according to various embodiments. First device 110 may transmit a request to establish a connection with second device 120 (step 310). In various embodiments the connection may comprise a TCP connection. However, in various embodiments, the connection may comprise any type of connection for transmitting data between devices. Second device 120 may accept the connection request (step 320). In various embodiments, the connection may be between secure sockets on first device 110 and second device 120.

In various embodiments, first device 110 may transmit a message comprising a cypher book to second device 120 (step 330). The cypher book may comprise a list of one-time cyphers, and may allow second device 120 to decrypt data sent to second device 120 over the secure socket connection using one time cyphers. In various embodiments, first device 110 may encrypt the message comprising the cypher book using known encryption methods, such as Advanced Encryption Standard ("AES") or RSA encryption. However, subsequent messages during the transfer session may be encrypted using the one-time cyphers contained in the cypher book. The messages encrypted using the one-time cyphers may be encrypted and decrypted using significantly less processing power and time than messages encrypted with AES or RSA. Additionally, the messages sent using the one-time cyphers may be indecipherable to parties not containing the cypher book.

First device 110 may send a file transfer request (step 340). For an example of a file transfer request, refer to FIG. 5. Second device 120 may accept the file transfer request (step 350). In response to second device 120 accepting the file transfer request, first device 110 may break the file into segments, and begin transmitting the segments to second device 120 (step 360). After first device 110 has transmitted all segments of the file, first device 110 may wait for confirmation that second device 120 has received all segments. Second device 120 may transmit a confirmation message to first device 110 indicating that all segments have been received (step 370). Second device 120 may decrypt and reassemble the segments according to SCP in order to recreate the file (step 380).

Referring to FIG. 4, an example of a discovery protocol 400 is illustrated according to various embodiments. Discovery protocol 400 may be implemented on the transport layer using TCP/UDP. However, in various embodiments, discovery protocols may be implemented using a Bluetooth® serial port, RS-232, or may be sent entirely over datagrams or a Windows® Socket API ("WSA"). The Local-Client in the illustrated embodiment may be a new instance of an IDiscoveredClient (defined in FIG. 5) class filled in with the device's identifying characteristics, such as device name, user name, preview image, and endpoint (in this case an IP address and port). First device 110 may open a new socket for a broadcast message (410). First device 110 may transmit the IP address that first device 110 is listening on for a response to the broadcast message (420). First device 110 may open a new datagram socket to listen for a response message (430). After receiving a response message, first device 110 may decipher the response message into the original IDiscoveredClient message that first device 110 sent (440).

Referring to FIG. 5, a definition for an example discovery protocol 500 is illustrated according to various embodiments. The definition may be a single common class called IDiscoveredClient that may be implemented by a transmitting device and a receiving device. In various embodiments, the definition may be expanded to include custom fields and any other information that users may desire. In various embodiments, the definition may comprise a name of the device (510), an IP address of the device (520), an owner of the device (530), and endpoint of the device (540), and a transport layer on which the device was discovered (550). However, one skilled in the art will appreciate that the particular fields used may be altered to any desired fields.

Referring to FIG. 6, a definition for an example file transfer request protocol 600 is illustrated according to various embodiments. The definition may be called "IFileTransferRequest." In various embodiments, the definition may comprise the name of the device transmitting a file (610), the filename to be sent (620), the size of the file (630), the device receiving the file (640), a unique identification for the file transfer (650), and the transport layer associated with the file transfer (660).

Referring to FIG. 7, a definition for a response to a file transfer request 700 is illustrated according to various embodiments. The receiving device may respond with a definition called IFileTransferResponse to indicate that the receiving device is willing to accept the file transfer. In various embodiments, IFileTransferResponse may comprise the response from the user (710) and the unique identification for the file transfer (720). The transmitting device may receive the response from the receiving device, and the transmitting device may proceed to transmit the file to the receiving device. Once a complete file transfer has occurred, the receiving device may transmit a confirmation to the transmitting device (730).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

A network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, Facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Moreover, examples of mobile device communications include texting, email, and mobile applications for smartphones.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As those skilled in the art will appreciate, a device may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A device may include but is not limited to any suitable personal computer, network computer, workstation, personal digital assistant, cellular phone, smart phone, minicomputer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the device may be further equipped with an Internet browser connected to the Internet or an intranet using standard dial-up, cable, DSL or any other Internet protocol known in the art. Transactions originating at a device may pass through a firewall in order to prevent unauthorized access from users of other networks. Further, additional firewalls may be deployed between the varying components of the system to further enhance security.

A firewall may include any hardware and/or software suitably configured to protect ACS components and/or enterprise computing resources from users of other networks. Further, a firewall may be configured to limit or restrict access to various systems and components behind the firewall for devices connecting through a web server. Firewall may reside in varying configurations including Stateful Inspection, Proxy based, access control lists, and Packet Filtering among others. Firewall may be integrated within a web server or any other ACS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. Web Sphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible, computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   implementing, by a processor, a standardized communications protocol ("SCP") on a first device, wherein the first device comprises a first chip;
   discovering by the first device available second devices;
   attaching an SCP header to a first packet in a message, wherein the SCP header identifies a datagram as an SCP datagram, wherein the message is defined by the first packet and a second packet;
   transmitting, using the first chip, the first packet to a second chip on a second device over a first transmission path; and
   transmitting, using the first chip, the second packet to the second chip on the second device over the first transmission path,
   wherein the second device uses a one time cypher to decrypt at least one of the first packet or the second packet,
   wherein the second device assembles the first packet and the second packet into the message.

2. The method of claim 1, further comprising determining, by the processor, available hardware for communication between the first device and the second device.

3. The method of claim 1, further comprising:
   determining a fastest transmission path between the first device and the second device; and
   selecting the first transmission path based on determining the fastest transmission path.

4. The method of claim 3, further comprising transmitting a first portion of the message over the first transmission path and a second portion of the message over a second transmission path.

5. An article of manufacture including a tangible, non-transitory computer-readable storage medium having instructions stored thereon that, in response to execution by a processor, cause the processor to perform operations comprising:
   implementing, by the processor, a standardized communications protocol ("SCP") on a first device, wherein the first device comprises a first chip;
   discovering, by the processor, available second devices;
   attaching, by the processor, an SCP header to a first packet in a plurality of packets, wherein the SCP header identifies a datagram as an SCP datagram, wherein the plurality of packets define a message;
   transmitting, by the processor and via the first chip, the first packet in the plurality of packets to a second chip on a second device over the first transmission path; and
   transmitting, by the processor and via the first chip, a second packet in the plurality of packets to the second chip on the second device over the first transmission path,
   wherein the second device uses a one time cypher to decrypt at least one of the first packet or the second packet,
   wherein the second device assembles the first packet and the second packet into the message.

6. The article of manufacture of claim 5, wherein the operations further comprise:
   determining, by the processor, a fastest transmission path between the first device and the second device; and
   selecting, by the processor, the first transmission path based on determining the fastest transmission path.

7. The article of manufacture of claim 5, wherein the operations further comprise dividing, by the processor, the message into the plurality of packets.

8. The article of manufacture of claim 5, wherein the operations further comprise encrypting, by the processor, the one time cypher using at least one of Advanced Encryption Standard or RSA encryption.

9. The article of manufacture of claim 5, wherein the operations further comprise encrypting, by the processor, a cypher book comprising the one time cypher.

10. The article of manufacture of claim 5, wherein the discovering comprises displaying a symbol on at least one of the first device and the second device.

11. A system comprising:
a processor,
a tangible, non-transitory memory configured to communicate with the processor,
the tangible, non-transitory memory having instructions stored thereon that, in response to execution by the processor, cause the processor to perform operations comprising:
implementing, by the processor, a standardized communications protocol ("SCP") on a first device, wherein the first device comprises a first chip;
discovering, by the processor, available second devices;
attaching, by the processor, an SCP header to a first packet in a plurality of packets, wherein the SCP header identifies a datagram as an SCP datagram, wherein the plurality of packets define a message;
transmitting, by the processor and via the first chip, the first packet in the plurality of packets to a second chip on a second device over the first transmission path; and
transmitting, by the processor and via the first chip, a second packet in the plurality of packets to the second chip on the second device over the first transmission path,
wherein the second device uses a one time cypher to decrypt at least one of the first packet or the second packet,
wherein the second device assembles the first packet and the second packet into the message.

12. The system of claim 11, wherein the operations further comprise:
determining, by the processor, a fastest transmission path between the first device and the second device; and
selecting, by the processor, the first transmission path based on determining the fastest transmission path.

13. The system of claim 11, wherein the operations further comprise streaming, by the processor and via the first chip, data from the first device to the second device.

14. The system of claim 11, wherein the first device and the second device are outside of transmission range, wherein the first device and the second device communicate via an intermediary device, and wherein the intermediary device is within transmission range of the first device and the second device.

15. The system of claim 11, wherein the SCP is implemented at a network layer in the first device.

16. A method comprising:
receiving, by a first device comprising a processor for communicating with a second device, a datagram from the second device, attaching a standardized communication protocol ("SCP") header to a first packet, wherein the SCP header identifies the datagram as an SCP datagram, wherein the first device comprises a first chip and a second chip, wherein the second device comprises a third chip and a fourth chip;
discovering by the first device available second devices;
receiving, with the first chip, a first packet from the third chip on the second device over a first transmission path;
receiving, with the first chip, a second packet from the second device over the first transmission path;
decrypting, by the processor, at least one of the first packet or the second packet using a one time cypher; and
assembling, by the processor, the first packet and the second packet into a message.

17. The method of claim 16, further comprising identifying, by the processor, the SCP header in the datagram.

18. The method of claim 16, further comprising transmitting, by the processor, a list of available transmission paths to the second device, wherein the list of available transmission paths comprises the first transmission path and a second transmission path.

19. The method of claim 16, further comprising receiving, by the processor and from the second device, the one time cypher.

20. The method of claim 18, further comprising receiving with the second chip a third packet from the fourth chip on the second device over a second transmission path.

21. A device comprising:
a first chip;
a processor,
a tangible, non-transitory memory configured to communicate with the processor,
the tangible, non-transitory memory having instructions stored thereon that, in response to execution by the processor, cause the processor to perform operations comprising:
implementing, by the processor, a standardized communications protocol ("SCP") on the device;
discovering, by the processor, an available second device;
attaching, by the processor, an SCP header to a first packet in a plurality of packets, wherein the SCP header identifies a datagram as an SCP datagram, wherein the plurality of packets define a message;
transmitting, by the processor and over a first transmission path, the first packet in the plurality of packets and a second packet in the plurality of packets from the first chip to a second chip of the second device,
wherein the second device uses a one time cypher to decrypt at least one of the first packet or the second packet,
wherein the second device assembles the first packet and the second packet into the message.

22. The device of claim 21, wherein the operations further comprise:
dividing, by the processor, the message into the plurality of packets;
selecting, by the processor, the first chip;
selecting, by the processor, the transmission path between the device and the second device; and
transmitting, by the processor and over the transmission path, the one time cypher to the second device.

23. A method comprising: implementing, by a processor, a standardized communications protocol ("SCP") on a first device, wherein the first device comprises a first chip; discovering, by the processor, an available second device; attaching an SCP header to a first packet of a message, wherein the SCP header identifies a datagram as an SCP datagram;
transmitting, using the first chip, a first portion of the message to a second chip on the second device; and
transmitting, using the first chip, a second portion of the message to the second chip on the second device, wherein the available second device uses a cypher to decrypt at least one of the first portion of the message or the second portion of the message, wherein the second device assembles the first portion of the message and the second portion of the message into the message.

24. The method of claim 22 further comprising: transmitting, by the processor, a cypher to a second device comprising a second chip; and selecting, by the processor, a first transmission path, wherein the first portion of the message and the second portion of the message are transmitted over the first transmission path.

25. The method of claim 23, wherein the selecting the first transmission path comprises determining a fastest transmission path between the first device and the second device.

26. The method of claim 22, wherein the first portion of the message comprises a first packet, and wherein the second portion of the message comprises a second packet.

27. The method of claim 23, further comprising transmitting a third portion of the message over a second transmission path.

28. A system comprising:
a processor,
a tangible, non-transitory memory configured to communicate with the processor, the tangible, non-transitory memory having instructions stored thereon that, in response to execution by the processor, cause the processor to perform operations comprising:
implementing, by the processor, a standardized communications protocol ("SCP") on a first device, wherein the first device comprises a first chip;
discovering, by the processor, an available second device;
attaching, by the processor, an SCP header to the first packet, wherein the SCP header identifies a datagram as an SCP datagram;
transmitting, by the processor and via the first chip, a first portion of a message to a second chip on the second device; and
transmitting, by the processor and via the first chip, a second portion of the message to the second chip on the second device,
wherein the second device uses a cypher to decrypt at least one of the first portion of the message or the second portion of the message,
wherein the second device assembles the first portion of the message and the second portion of the message into the message.

29. The system of claim 22, wherein the operations further comprise:
transmitting, by the processor, the cypher to a second device comprising a second chip; and
selecting, by the processor, a first transmission path, wherein the first portion of the message and the second portion of the message are transmitted over the first transmission path.

30. The system of claim 28, wherein the selecting the first transmission path comprises determining a fastest transmission path between the first device and the second device.

31. The system of claim 27, wherein the first portion of the message comprises a first packet, and wherein the second portion of the message comprises a second packet.

32. The system of claim 28, the operations further comprising transmitting a third portion of the message over a second transmission path.

33. An article of manufacture including a tangible, non-transitory computer-readable storage medium having instructions stored thereon that, in response to execution by a processor for transmitting data in a peer-to-peer system, cause the processor to perform operations comprising:
implementing, by the processor, a standardized communications protocol ("SCP") on a first device, wherein the first device comprises a first chip;
discovering, by the processor, an available second device;
attaching, by the processor, an SCP header to the first packet, wherein the SCP header identifies a datagram as an SCP datagram;
transmitting, by the processor and via the first chip, a first portion of a message to a second chip on the second device; and
transmitting, by the processor and via the first chip, a second portion of the message to the second chip on the second device,
wherein the second device uses a cypher to decrypt at least one of the first portion of the message or the second portion of the message,
wherein the second device assembles the first portion of the message and the second portion of the message into the message.

34. The article of manufacture of claim 32, wherein the operations further comprise:
transmitting, by the processor, the cypher to a second device comprising a second chip; and
selecting, by the processor, a first transmission path, wherein the first portion of the message and the second portion of the message are transmitted over the first transmission path.

35. The article of manufacture of claim 33, wherein the selecting the first transmission path comprises determining a fastest transmission path between the first device and the second device.

36. The article of manufacture of claim 32, wherein the first portion of the message comprises a first packet, and wherein the second portion of the message comprises a second packet.

37. The article of manufacture of claim 33, the operations further comprising transmitting a third portion of the message over a second transmission path.

* * * * *